United States Patent
Graube et al.

(10) Patent No.: US 10,546,110 B2
(45) Date of Patent: Jan. 28, 2020

(54) SYSTEMS AND METHODS FOR CONTEXT-BASED DEVICE ADDRESS GENERATION

(71) Applicant: QUALCOMM Incorporated, San Diego, CA (US)

(72) Inventors: Nicolas Graube, Cambridge (GB); Mauro Scagnol, Great Cambourne (GB)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 15/730,292

(22) Filed: Oct. 11, 2017

(65) Prior Publication Data

US 2019/0108324 A1 Apr. 11, 2019

(51) Int. Cl.
| | |
|---|---|
| G06F 21/32 | (2013.01) |
| G06F 21/83 | (2013.01) |
| H04L 9/32 | (2006.01) |
| H04L 29/06 | (2006.01) |

(52) U.S. Cl.
CPC ............ *G06F 21/32* (2013.01); *G06F 21/83* (2013.01); *H04L 9/3231* (2013.01); *H04L 63/0861* (2013.01); *H04L 9/3271* (2013.01); *H04L 2209/805* (2013.01)

(58) Field of Classification Search
CPC ....... G06F 21/30; G06F 21/32; H04L 9/0861; H04L 9/0866; H04L 9/0872
See application file for complete search history.

(56) References Cited

U.S. PATENT DOCUMENTS

| | | | |
|---|---|---|---|
| 8,902,045 B1* | 12/2014 | Linn | G06F 21/32 340/5.53 |
| 9,100,825 B2 | 8/2015 | Schultz et al. | |
| 9,118,488 B2 | 8/2015 | Donaldson et al. | |
| 9,514,197 B2* | 12/2016 | Akin | G06T 7/194 |
| 10,037,676 B1* | 7/2018 | Scharf | G08B 21/182 |
| 10,097,538 B1* | 10/2018 | Sanchez | G06F 21/36 |
| 2004/0010697 A1* | 1/2004 | White | G06F 21/31 713/186 |
| 2011/0320201 A1* | 12/2011 | Kaufman | G10L 17/04 704/251 |
| 2012/0154117 A1* | 6/2012 | Nice | G06F 21/32 340/5.82 |

(Continued)

FOREIGN PATENT DOCUMENTS

| | | | |
|---|---|---|---|
| EP | 2953328 A1 | 12/2015 | |
| GB | 2378545 A * | 2/2003 | ............. G06F 21/32 |

(Continued)

OTHER PUBLICATIONS

International Search Report and Written Opinion—PCT/US2018/049148—ISA/EPO—dated Dec. 6, 2018.

*Primary Examiner* — Ponnoreay Pich
(74) *Attorney, Agent, or Firm* — Austin Rapp

(57) ABSTRACT

A method is described. The method includes associating an identity to a computing device based on a context measurement. The method also includes generating a network address for the computing device based on the associated identity. The context measurement may include a biometric measurement and the network address of the computing device may be a function of the biometric measurement.

21 Claims, 9 Drawing Sheets

(56) References Cited

U.S. PATENT DOCUMENTS

| | | | |
|---|---|---|---|
| 2013/0188538 A1* | 7/2013 | Kainulainen | G01S 3/48 |
| | | | 370/310 |
| 2015/0205622 A1 | 7/2015 | Divincent et al. | |
| 2016/0021081 A1* | 1/2016 | Caceres | H04L 63/08 |
| | | | 726/7 |
| 2016/0094550 A1 | 3/2016 | Bradley et al. | |
| 2017/0264600 A1 | 9/2017 | Froelicher et al. | |
| 2018/0198752 A1* | 7/2018 | Zhang | H04L 61/103 |

FOREIGN PATENT DOCUMENTS

| | | |
|---|---|---|
| JP | 4291803 B2 | 7/2009 |
| WO | 2016131325 A1 | 8/2016 |
| WO | 2017105453 A1 | 6/2017 |

\* cited by examiner

SYSTEMS AND METHODS FOR CONTEXT-BASED DEVICE ADDRESS GENERATION

TECHNICAL FIELD

The described technology generally relates to an apparatus and method of communication. More particularly, the technology relates to systems and methods for context-based device address generation.

BACKGROUND

In the last several decades, the use of computing devices has become common. In particular, advances in electronic technology have reduced the cost of increasingly complex and useful computing devices. Cost reduction and consumer demand have proliferated the use of computing devices such that they are practically ubiquitous in modern society. As the use of computing devices has expanded, so has the demand for new and improved features of computing devices. More specifically, computing devices that perform new functions and/or that perform functions faster, more efficiently or more reliably are often sought after.

Advances in technology have resulted in smaller and more powerful computing devices. Such computing devices are being manufactured to enable communications using a variety of wired and wireless communication technologies. For example, there currently exists a variety of wireless communication devices such as portable wireless telephones (e.g., smartphones), personal digital assistants, laptop computers, tablet computers, paging devices and headsets that are each small, lightweight and can be easily carried by users.

A computing device may be used in different contexts. In one example, a computing device may be shared among multiple users. In another example, a computing device may be used in different physical environments. Benefits may be realized by determining a network address of the computing device through context-based device addressing. The benefits are obtained through the provision of different network identities based on the context.

SUMMARY

A method is described. The method includes associating an identity to a computing device based on a context measurement. The method also includes generating a network address for the computing device based on the associated identity.

The context measurement may include a biometric measurement and the network address of the computing device may be a function of the biometric measurement. The context measurement may include a sound determination identifying a physical context, and the network address of the computing device may be a function of the sound determination.

Associating an identity to the computing device based on a context measurement may include associating a biometric template to a user of the computing device based on a biometric measurement.

Generating the network address for the computing device may include identifying a match to an associated identity based on a biometric measurement. An identity resolving key (IRK) of the computing device that is a function of the biometric measurement may be determined. Generating the network address for the computing device may further include generating a private resolvable address (PRA) of the computing device that is a function of the biometric measurement-based IRK.

Generating the network address for the computing device may include generating a fixed medium access control (MAC) address of the computing device that is based on a biometric measurement.

The method may also include bonding with a remote computing device using the network address generated using a biometric measurement. Bonding with a remote computing device using the network address may include sharing an IRK generated as a function of the biometric measurement with the remote computing device.

The network address may be repeatable over time for context measurements that are within a threshold of the associated identity. An IRK generated as a function of the biometric measurement may be repeatable over time for context measurements that are within a threshold of the associated identity.

A computing device is described. The computing device includes a memory and a processor in communication with the memory. The processor is configured to associate an identity to the computing device based on a context measurement. The processor is also configured to generate a network address for the computing device based on the associated identity.

A non-transitory tangible computer readable medium is also described. The computer readable medium stores computer executable code for causing a computing device to associate an identity to the computing device based on a context measurement. The computer readable medium also stores code for causing the computing device to generate a network address for the computing device based on the associated identity.

An apparatus is also described. The apparatus includes means for associating an identity to the apparatus based on a context measurement. The apparatus also includes means for generating a network address for the apparatus based on the associated identity.

DETAILED DESCRIPTION

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
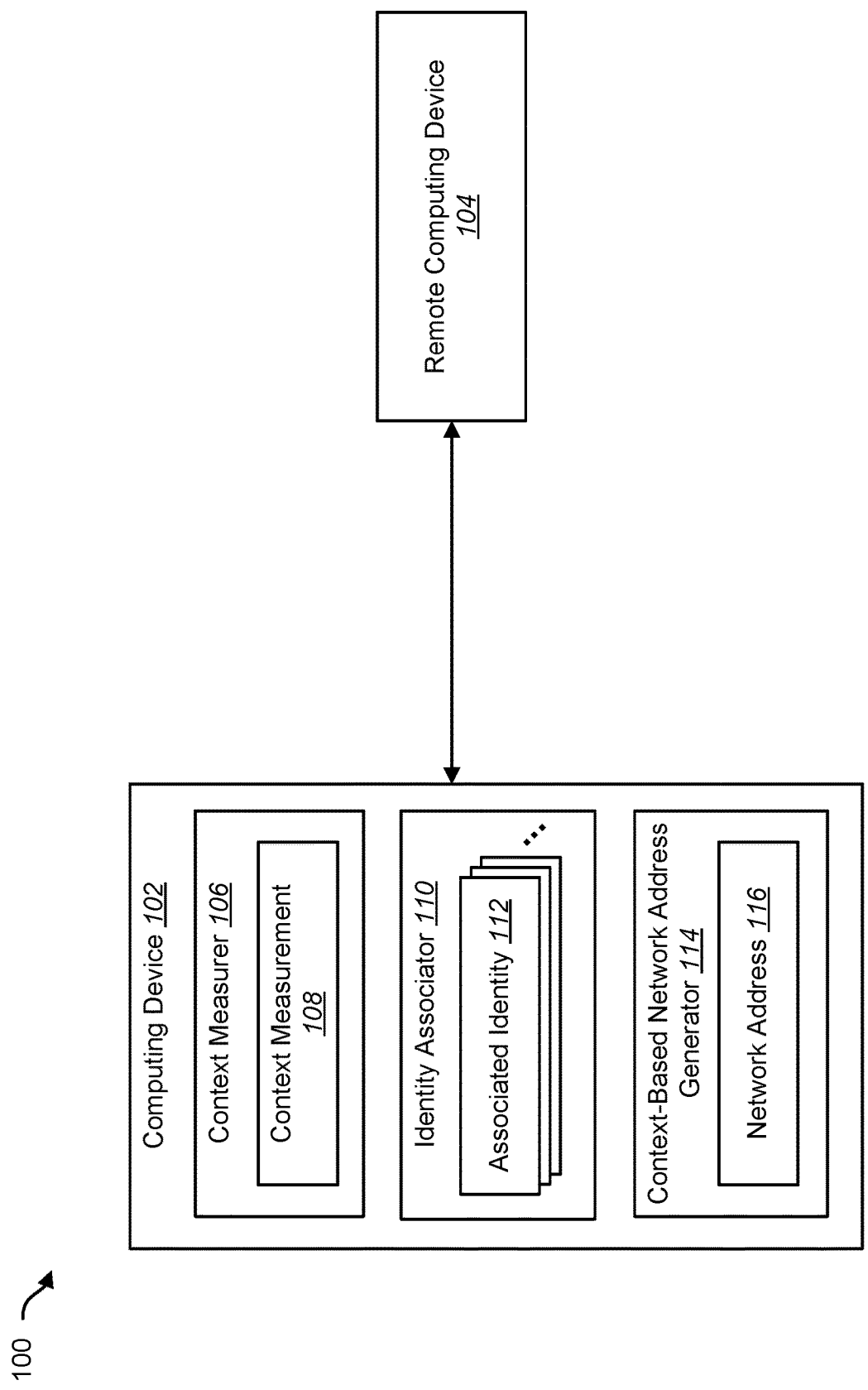
FIG. 1 is a block diagram illustrating one configuration of a computing device configured for context-based device address generation.

FIG. 1 is a block diagram illustrating one configuration of a computing device 102 configured for context-based device address generation. The computing device 102 may be a physical entity. Examples of computing devices 102 include laptop or desktop computers, cellular phones, smartphones, wireless modems, e-readers, tablet devices, gaming systems, keyboards, keypads, computer mice, remote controllers, handsets, headsets, headphones, automobile hands-free audio system, etc.

The computing device 102 may be configured to communicate in a network 100. For example, the computing device 102 may communicate with a remote computing device 104 using one or more communication technologies. These communication technologies may include wired communication technologies and wireless communication technologies.

Examples of wired communication technologies include Ethernet and universal serial bus (USB) standards. Other examples of wired communication include telephone networks, cable television, internet access, and fiber-optic communication.

Wireless communication includes the transfer of information between two or more computing devices that are not connected by an electrical or optical conductor. For example, wireless communication may be implemented through the exchange of electromagnetic waves (e.g., radio waves) or magnetic fields.

Examples of wireless communication technologies include Third Generation Partnership Project (3GPP) Long Term Evolution (LTE) standards, Institute of Electrical and Electronics Engineers (IEEE) 802.11a, 802.11b, 802.11g, 802.11n and/or 802.11ac (e.g., Wireless Fidelity or "Wi-Fi") standards, Bluetooth standards, IEEE 802.16 (e.g., Worldwide Interoperability for Microwave Access or "WiMAX") standards, Code Division Multiplier Access (CDMA) 2000 1× (referred to herein as "1×", may also be referred to as IS-2000 or 1×RTT) standards, Evolution-Data Optimized (EVDO) standards, Interim Standard 95 (IS-95), High Data Rate (HDR), High Rate Packet Data (HRPD), evolved High Rate Packet Data (eHRPD), radio standards and others. Wireless Wide Area Network (WWAN) may also include Wireless Metropolitan Area Networking (WMAN) standards and High-Speed Downlink Packet Access (HSDPA) standards.

Communications in a wireless communication system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

In many scenarios, a computing device 102 may be used in multiple contexts. For example, a computing device 102 may be shared among multiple persons in a household or an office. It should be noted that in this scenario there is a combination of both multiple users and multiple physical contexts. In this example, each user may want to pair the computing device 102 to one of their devices (e.g., their own smartphone) or use the computing device 102 to be provided with a service inside a network (e.g., an earbud being served an audio-stream by a network of audio pods in a house).

In another example, a heart-rate monitor or other medical device may be shared. In another scenario, a shared computing device 102 may be bonded to a shared infrastructure. For example, medical devices may be served by a distributed network of medical access points in a hospital. In another scenario, each user may need to pair the computing device 102 to one of their own devices. For example, in a call-center, enterprise class headsets are paired with agents' personal computers (PCs).

In another scenario, services provided by a shared infrastructure may be user specific. Examples of user-specific services include music stream choice, person-specific heart-rate monitoring or activity logging. Each user may be interested in or authorized to access different services (e.g., music streams, baby-monitor, security-alerts, etc.).

Users are likely to want the computing device 102 to be discovered by and connected to their own mobile only when used by them (and not by another person). Similarly, a customized service associated to the computing device 102 provided by one or more service providers should be unlocked only when a specific person is using the computing device 102 and not someone else.

In another example, it may be desirable for the computing device 102 to have different network identities based on the sounds in the vicinity of the computing device 102 or based on other measurable contexts. For example, sounds may indicate the physical context (e.g., car, restaurant, office, home, open air, windy surrounding, sea side, etc.) of the computing device 102. It may be beneficial to configure the computing device 102 with one network address 116 when a sound determination indicates one physical context and another network address 116 when a sound determination indicates another physical context. Similarly, it may be beneficial to configure the network address 116 of a computing device 102 based on other measurable contexts (e.g., light, time, motion (e.g., vibration), temperature, location, etc.).

The computing device 102 may use a network address 116 as a network identity to communicate with remote computing devices 104 on a network 100. The computing device 102 may be addressed in a network 100 using different approaches. In one approach, a computing device 102 may be addressed in a network 100 with a Medium Access Control (MAC) Address. Wireless communication devices may be associated with one Medium Access Address (e.g., Wi-Fi MAC Address or Bluetooth device address (BD-ADDR)).

The network address 116 is also used to (re)discover the computing device 102 and connect to it. For example, if multiple users share the same computing device 102 and each user has paired the computing device 102 with their own mobile or introduced the device in a network of service providers, management of the shared users becomes a high-level application concern.

In another approach, a wireless device may be addressed using a variable (e.g., time-varying), pseudonymous address that can be resolved using cryptographic means. For example, Bluetooth low energy uses a Private Resolvable Addresses (PRA) as a pseudonymous address. In this approach, each peripheral device (i.e., slave device) defines a 128-bit Identity Resolving Key (IRK). The peripheral shares the IRK with centrals (i.e., master devices) it bonds with. The centrals can determine if received beacons are transmitted by the peripheral by resolving the PRA that is used at a given time t. For example, the computing device 102 may have a given PRA at a given time t1 and that it may have a different PRA a later time t2.

A problem with network communication includes connecting to a computing device 102 depending on a measurable context. For example, a computing device 102 may need to connect to a remote computing device 104 based on the user of the computing device 102. A shared computing device 102 needs to be discovered and connected to by somebody's smartphone only when used by them (and not by another person). For example, the smartphone of User A may need to connect to the headset only when User A is wearing the headset and not when User B is wearing the headset.

In another problem, a customized service may have to be provided depending on the person using the shared computing device 102. In a hospital scenario, when a handheld computing device 102 is used by a nurse, a given set of medical records may be disclosed. When the computing device 102 is used by another nurse or a doctor, the set of medical records may be different.

In another example, a shared headset used to enable a voice user interface (UI) for a digital personal assistant should forward voice utterances to the digital personal assistant using the account credentials of User A only when User A is wearing the headset. When User B is wearing the headset, the headset should not forward voice utterances to the digital personal assistant using the account credentials of User A.

Currently, the solution for these problems is a fixed connectivity context for the device to allow connectivity between the computing device 102 and a server, followed, at the application layer (e.g., layer 7 of the open systems interconnect (OSI) model), by a gating protocol for authentication/authorization of the user (e.g., requesting a password or a biometric signature).

In another example of a measurable context, it may be beneficial for a computing device 102 to determine its network address 116 based on a sound determination. For example, it may be beneficial to generate a network address 116 based on the sounds that the computing device 102 detects. Other examples of measurable contexts that may be used to determine the network address 116 of the computing device 102 include light, time, motion (e.g., vibration), temperature, location and other contexts that can be measured by sensors or circuitry of the computing device 102.

The systems and methods described herein provide for computing device addressability conditioned by a measurable context. In particular, a network address 116 of the computing device 102 may be generated based on an associated identity 112 and a context measurement 108. In one case, the context measurement 108 may be a biometric measurement. In another case, the context measurement 108 may include a sound determination. Other measurable contexts may also be used to generate a network address 116. For example, the context measurement 108 may include a measurement of environmental conditions (e.g., light, motion, temperature, etc.), time conditions (e.g., time of day) and/or the location of the computing device 102.

The computing device 102 may include a context measurer 106. The context measurer 106 may be implemented as hardware (e.g., circuitry), software or a combination of hardware and software. For example, the context measurer 106 may be implemented by a processor of the computing device 102.

The context measurer 106 may obtain a context measurement 108. For example, in the case of a biometric context, the context measurement 108 may be a biological or behavioral measurement of a user of the computing device 102. The biometric measurements may be distinctive biological and/or behavioral characteristics that are used to identify an individual. Examples of biometric measurements include heart rate and/or heart pattern, stride and step pattern, fingerprint, facial recognition, iris scan, voice characteristics, etc.

In the case of a sound determination, the context measurement 108 may be a sound recording of the physical environment in which the computing device 102 is located. For example, the computing device 102 may include a microphone that records the sounds in the vicinity of the computing device 102. Examples of physical environments include car, restaurant, office, home, open air, windy surrounding, sea side, etc.

In another approach, the context measurement 108 may include a light determination. In the case of a light determination, the context measurement 108 may be the amount of light detected by a camera or other optical sensor associated with the computing device 102.

In another approach, the context measurement 108 may include a time determination. In this case, the context measurer 106 may determine the current time of the computing device 102 or an amount of time that has elapsed from a start time.

In another approach, the context measurement 108 may include a motion determination. In this case, the context measurer 106 may obtain a motion measurement of the computing device 102. For example, the computing device 102 may include an accelerometer or other motion sensor. The motion measurement may indicate whether the computing device 102 is in motion or whether the computing device 102 is stationary.

In another approach, the context measurement 108 may include a location determination. In this case, the context measurer 106 may receive a location measurement. For example, the context measurement 108 may be the global positioning system (GPS) location of the computing device 102.

In another approach, the context measurement 108 may include a temperature determination. In this case, the context measurer 106 may obtain a temperature measurement. For example, a temperature sensor in communication with the computing device 102 may provide a temperature measurement.

The computing device 102 may include an identity associator 110. The identity associator 110 may associate an identity 112 to the computing device 102 based on the context measurement 108. In the case of a biometric measurement, the identity associator 110 may associate a given user to a biometric template. This biometric template may be stored to identify the user on subsequent biometric authentication operations. For example, the computing device 102 may obtain a voice stream of a user of the computing device 102. The computing device 102 may compare the voice stream to the biometric template of one or more associated identities 112 (e.g., associated users of the computing device 102). If the voice stream matches a biometric template, then the identity of the user is determined.

In the case that the measurable context includes a sound determination, the associated identity 112 may include the physical context of the computing device 102. For example, the associated identity 112 may be "in a car," "in a restaurant," "at home," "at the sea side," "in a windy location" or other physical contexts that may be identified by their unique sounds. The computing device 102 may store a sound template for the one or more physical contexts. A sound template may include parameters that uniquely identify a certain physical context. The computing device 102 may identify a particular physical context (i.e., an associated identity 112) by comparing the sound (i.e., a context measurement 108) in the vicinity of the computing device 102 to one or more sound templates.

In the case that the measurable context includes a light determination, the associated identity 112 may include light characteristics that identify a context of the computing device 102. For example, different identities of the computing device 102 may be associated to the computing device 102 based on light levels measured by a camera or other light sensor of the computing device 102. One associated identity 112 may be for low light levels and another associated identity 112 may be for high light levels. Other light characteristics that may be used to associate an identity 112 include light patterns, shapes, or other visual features.

In the case that the measurable context includes a time determination, an identity 112 may be associated to the computing device 102 based on time. For example, an identity 112 may be associated to the computing device 102 for a certain time of day (e.g., morning, afternoon, night). Therefore, the computing device 102 may have one associated identity 112 for one time of day and another associated identity 112 for another time of day.

In the case that the measurable context includes a motion determination, the computing device 102 may associate one or more identities 112 to the computing device 102 based on amounts of motion. For example, a range of vibration as measured by an accelerometer may be associated with one identity 112 and another range of vibration may be associated with another identity 112. In this case, one identity 112 may be associated when the computing device 102 is stationary and another identity 112 may be associated when the computing device 102 is in motion.

In the case that the measurable context includes a location determination, the computing device 102 may associate one or more identities 112 to the computing device 102 based on the location of the computing device 102. For example, the computing device 102 may associate the GPS coordinates of a given location to an identity 112. The computing device 102 may associate different locations to different identities 112. For example, one associated identity 112 may be for "home" while another associated identity 112 may be for "office".

In the case that the measurable context includes a temperature determination, the computing device 102 may associate one or more identities 112 to the computing device 102 based on temperatures measured by the computing device 102. For example, an identity 112 may be associated to the computing device 102 when the temperature measurement is within a certain temperature range. Another identity 112 may be associated to the computing device 102 when the temperature measurement is within another temperature range.

As observed by this discussion, there may be a plurality of means to have the computing device 102 change the identity 112. For example, the associated identity 112 may be based on a wearer, based on a physical context or combinations of both.

The computing device 102 may include a context-based network address generator 114 that generates the network address 116 for the computing device 102 based on the associated identity 112 and the context measurement 108. The context-based network address generator 114 may generate a certain network address 116 for a given associated identity 112. The network address 116 may be a function of the context measurement 108.

In the case of a biometric measurement, the network address 116 of the computing device 102 may be a function of the biometric template associated with a given user. For example, upon authenticating a user by comparing a biometric measurement against a stored biometric template, the context-based network address generator 114 may use the biometric template as input to generate a unique network address 116. In an implementation, the context-based network address generator 114 may use a cryptographic hash function (e.g., secure hash algorithm (SHA)) to generate the network address 116.

In the case when a sound determination is used to determine the network address 116, the context-based network address generator 114 may generate the network address 116 as a function of the sound determination. For example, a physical context (e.g., car, restaurant, office, home, open air, windy surrounding, sea side, etc.) may be identified by a sound measurement, as described above. The context-based network address generator 114 may generate a different network address 116 for each associated identity 112 (i.e., associated physical context).

In an implementation, the context-based network address generator 114 may generate the network address 116 as a function of the sound parameters that uniquely identify a certain physical context. For example, one physical context (e.g., car) may have one sound template and another physical context (e.g., home) may have another sound template. The context-based network address generator 114 may use the sound template of a given associated identity 112 to generate a network address 116 that is unique to that identity 112.

A similar approach may be used to generate a network address 116 based on other measurable contexts (e.g., light, time, motion, vibration, temperature, location, etc.). The computing device 102 may determine an associated identity 112 based on a context measurement 108. The computing device 102 may then generate a network address 116 based on the associated identity 112.

In one approach, the network address 116 may be a MAC address. It should be noted that a MAC address is typically fixed at manufacturing of the computing device 102. For example, a Bluetooth device may have a 48-bit MAC address (referred to as BD_ADDR). However, the computing device 102 may modify the MAC address that is presented in network communication based on the associated identity 112 that is determined by the context measurement 108. In this manner, the computing device 102 may appear as a different device for each associated identity 112.

In another approach, the network address 116 may be a time-varying pseudonymous address. For example, the network address 116 may be a variable, time-varying, pseudonymous address that can be resolved using cryptographic means. In some communication technologies (e.g., Bluetooth low energy (BLE)), a peripheral device may provide a central device with an identity resolving key (IRK). For example, upon bonding with the central device, the peripheral device may share the IRK. The peripheral device may beacon using a Private Resolvable Addresses (PRA) that is generated using the IRK. The central device may determine if received beacons are transmitted by the peripheral device by resolving the PRA(t) included in the beacon using the IRK provided by the peripheral.

In the approach described herein, the computing device 102 may generate a unique IRK for each associated identity 112. For example, the computing device 102 may generate one IRK for User A using the biometric template of User A. The computing device 102 may generate another IRK for User B using the biometric template of User B and so forth.

The IRK for a certain associated identity 112 may be shared with a remote computing device 104 during bonding with the computing device 102. Then, the context-based network address generator 114 may generate the PRA that is used for network communication using the unique IRK. Thus, different identities 112 will have different IRKs and the computing device 102 will appear to be different devices for different identities 112 as observed by a remote computing device 104. An example of generating a network address 116 in a BLE context is described in connection with FIG. 5.

It should be noted that the network communication described herein may occur after generating the network address 116. In other words, the computing device 102 may only start communicating on the network 100 once the network address 116 is generated based on the context measurement 108. Therefore, in some scenarios, no network activity (i.e., communication) by the computing device 102 occurs prior to generating the network address 116.

In an implementation, if the context measurer 106 is not able to obtain a context measurement 108 or the identity associator 110 is not able to determine an identity based on a context measurement 108, then the computing device 102 may still make itself detectable and join the network 100 in a non-customized mode and with a network address 116 that does not belong to a privileged sub-set. In this case, only a limited set of functionality could be exposed. For example, a tablet that can be used to browse the web and to give access to the intranet where sensitive resources (e.g., like patient databases) are located, could just be used to browse the web if no privileged user has been identified. In this case, the network address 116 associated to the tablet is not part of a restricted range, but no access to intranet resources is provided. The access to intranet resources may be restricted, in the first place, to a special network address range.

The network address 116 generated for a given associated identity 112 may be repeatable over time. For example, if a context measurement 108 is within a threshold for an associated identity 112, then the context-based network address generator 114 may generate the same network address 116. Therefore, the network address 116 is not randomly generated for subsequent context measurements 108 matching an associated identity 112. In an approach, the context-based network address generator 114 may use a template (e.g., biometric template, sound template, etc.) of an associated identity 112 to generate the network address 116. Because the template is unique to an associated identity 112, the generated network address 116 for a given associated identity 112 will be consistent each time it is regenerated.

The network address generation is transparent to remote computing devices 104. The computing device 102 generates a network address 116 for an associated identity 112 and communicates on the network 100 using that network address 116. A remote computing device 104 may operate in a normal fashion upon detecting the network address 116. The remote computing device 104 may treat the computing device 102 as one device when the computing device 102 uses one network address 116 and the remote computing device 104 may treat the computing device 102 as another device when the computing device 102 uses another network address 116.

As observed by this discussion, the generation of the network address 116 is important and the addressing is a usage of this generated network address 116. The network address 116 is part of (i.e., is a function of) an associated identity 112. The computing device 102 may define the network address 116 through determination of a plurality of contexts (where some contexts can be based on biometrics).

It should also be noted that the network address generation occurs at the device address level (e.g., layer 2 of the OSI model) instead of the application layer. By implementing address generation at the device address level, the computing device 102 may efficiently present itself as different devices in a network 100 based on an associated identity 112. For example, if the computing device 102 has a fixed network address 116, when the computing device 102 is shared between multiple people, an application layer of the remote computing device 104 must be used to try to resolve the user conflict. However, the approach described herein avoids having to use the application layer of the remote computing device 104 to resolve conflicts between the identity 112 of the computing device 102 by presenting unique network addresses 116 for different identities 112. In another implementation, having a given network address 116 or a network address 116 in a specific range at layer 2 may be a pre-requisite to access certain resources on the network 100, thus avoiding conflict resolution at higher layers. The described systems and methods save time, energy (e.g., battery power) and provide for a better user experience.

Figure 2:
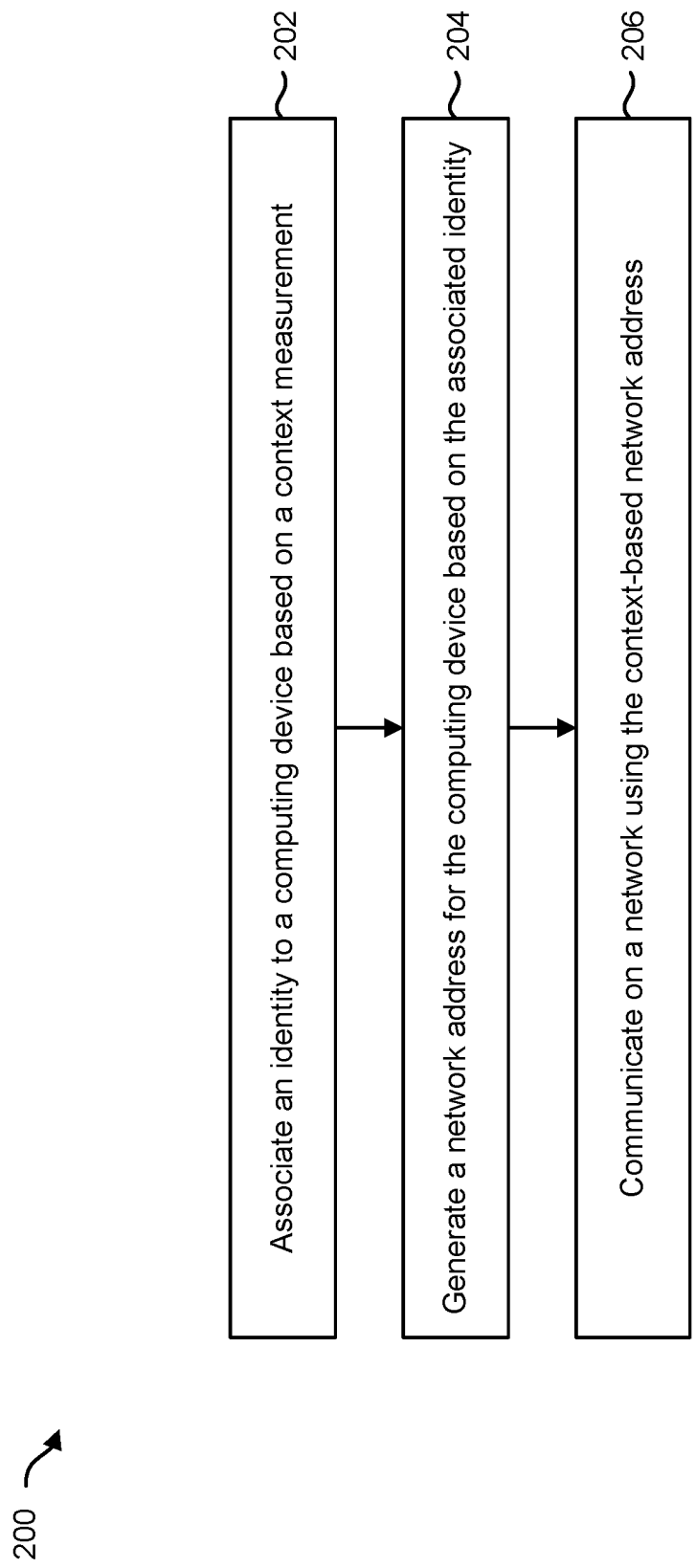
FIG. 2 is a flow diagram illustrating a method for context-based device addressing by a computing device.

FIG. 2 is a flow diagram illustrating a method 200 for context-based device addressing by a computing device 102. The computing device 102 may associate 202 an identity 112 to the computing device 102 based on a context measurement 108. For example, the context measurement 108 may include a biometric measurement, a sound determination or other measurement.

In the case of a biometric measurement, the computing device 102 may associate 202 a biometric template to a user of the computing device 102 based on a biometric measurement. In the case of a sound determination, the computing device 102 may associate 202 a sound template that identifies a particular physical context based on a sound measurement.

The computing device 102 may generate 204 a network address 116 for the computing device 102 based on the associated identity 112. For example, in the case of a biometric measurement, the computing device 102 may identify a match to an associated identity 112 (e.g., biometric template) based on a biometric measurement. The computing device 102 may then generate 204 the network address 116 as a function of the biometric measurement.

In the case of a sound determination, the computing device 102 may determine whether a sound recording matches an associated identity 112 (e.g., a sound template for a physical context). If the sound determination matches an associated identity 112, then the computing device 102 may generate 204 a network address 116 as a function of the sound determination.

In one approach, the context-based network address 116 may be a MAC address that is generated as a function of the context measurement 108. In another approach, the network address 116 may be a time-varying pseudonymous address. For example, the computing device 102 may determine an identity resolving key (IRK) that is a function of the context measurement 108. The computing device 102 may then generate a private resolvable addresses (PRA) of the computing device that is a function of the context-based IRK.

The network address 116 may be repeatable over time for context measurements 108 that are within a threshold of the associated identity 112. For example, after enrolling a user with a given biometric template, subsequent biometric measurements of the same user result in the same network address 116. Similarly, whenever a sound determination is within a threshold amount of a sound template, then the computing device 102 may generate the same network address 116.

The computing device 102 may communicate 206 on the network 100 using the context-based network address 116. For example, the computing device 102 may use its network address 116 as a source address when transmitting data packets (e.g., TCP/IP packets). A remote computing device 104 may use the context-based network address 116 of the computing device 102 as a destination address when sending data packets to the computing device 102.

Figure 3:
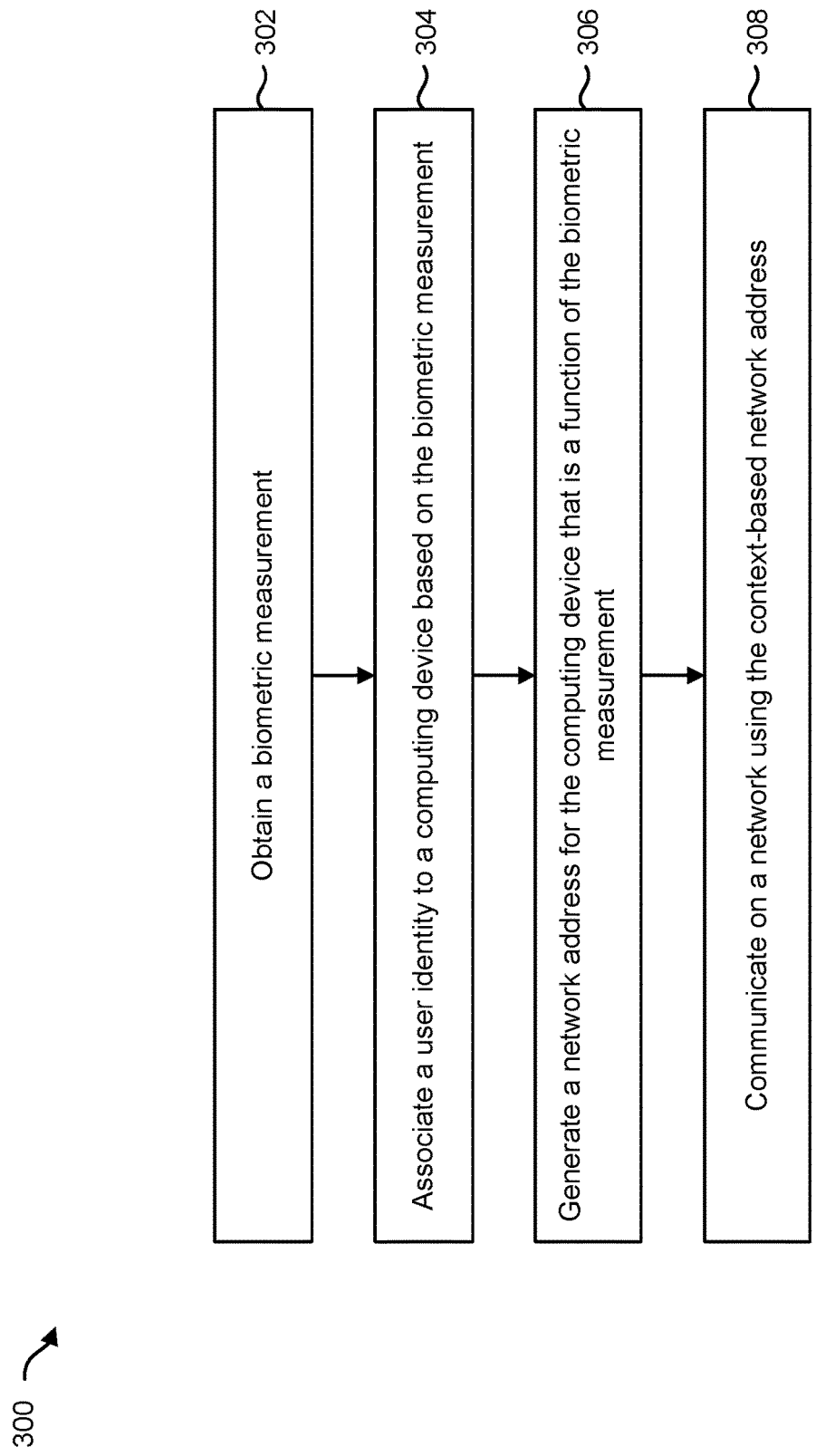
FIG. 3 is a flow diagram illustrating another method for context-based device addressing by a computing device.

FIG. 3 is a flow diagram illustrating another method 300 for context-based device addressing by a computing device 102. The computing device 102 may obtain 302 a biometric measurement. For example, the computing device 102 may be configured with a biometric sensor to acquire the biometric measurement or the computing device 102 may be configured to receive a biometric measurement from a remote location. Examples of biometric measurements include heart rate and/or heart pattern, stride and step pattern, fingerprint, facial recognition, iris scan, voice characteristics, etc.

The computing device 102 may associate 304 a user identity to the computing device 102 based on the biometric measurement. For example, the computing device 102 may associate a biometric template to a user of the computing device 102 based on parameters obtained from the biometric measurement.

The computing device 102 may generate 306 a network address 116 for the computing device 102 that is a function of the biometric measurement. For example, the computing device 102 may identify a match to a biometric template of an associated user identity based on the biometric measurement. The computing device 102 may then generate 306 a pseudonymous address (e.g., PRA by means of the IRK associated to a given user identity) or a MAC address that is a function of the biometric template of the associated user identity that matches the biometric measurement.

The network address 116 may be repeatable over time for biometric measurements that are within a threshold of the associated user identity. In other words, for subsequent biometric measurements that match the biometric template, the computing device 102 may generate the same network address 116. In the case of pseudonymous addresses, the computing device 102 would regenerate the same IRK for a given associated user identity. The IRK would then be used to generate the network address 116 (e.g., PRA=f(random number, IRK applied to the random number)). If the computing device 102 re-uses with the IRK the same random number that was used last time, the generated network address 116 would be the same. If a different random number is used, a different network address 116 is generated but the peer, with whom the IRK was shared at pairing time, would still be able to resolve the network address 116, identify the computing device 102 and connect to it.

The computing device 102 may communicate 308 on the network 100 using the context-based network address 116.

In an implementation, the computing device 102 may bond with a remote computing device 104 using the network address 116 generated using the context measurement 108. In an example, when User A performs a biometric authentication on a wireless headset, the wireless headset may generate a network address 116 based on the biometric template of User A. The wireless headset may be paired with a smartphone of User A using the context-based network address 116. Then for subsequent biometric measurements matching the biometric template of User A, the headset may generate the same network address 116 and reconnect with the smartphone. However, a biometric measurement of another user may result in another network address 116, which the smartphone of User A may not recognize. In this case, if someone other than User A is wearing the headset, the smartphone of User A may not connect to the headset.

Figure 4:
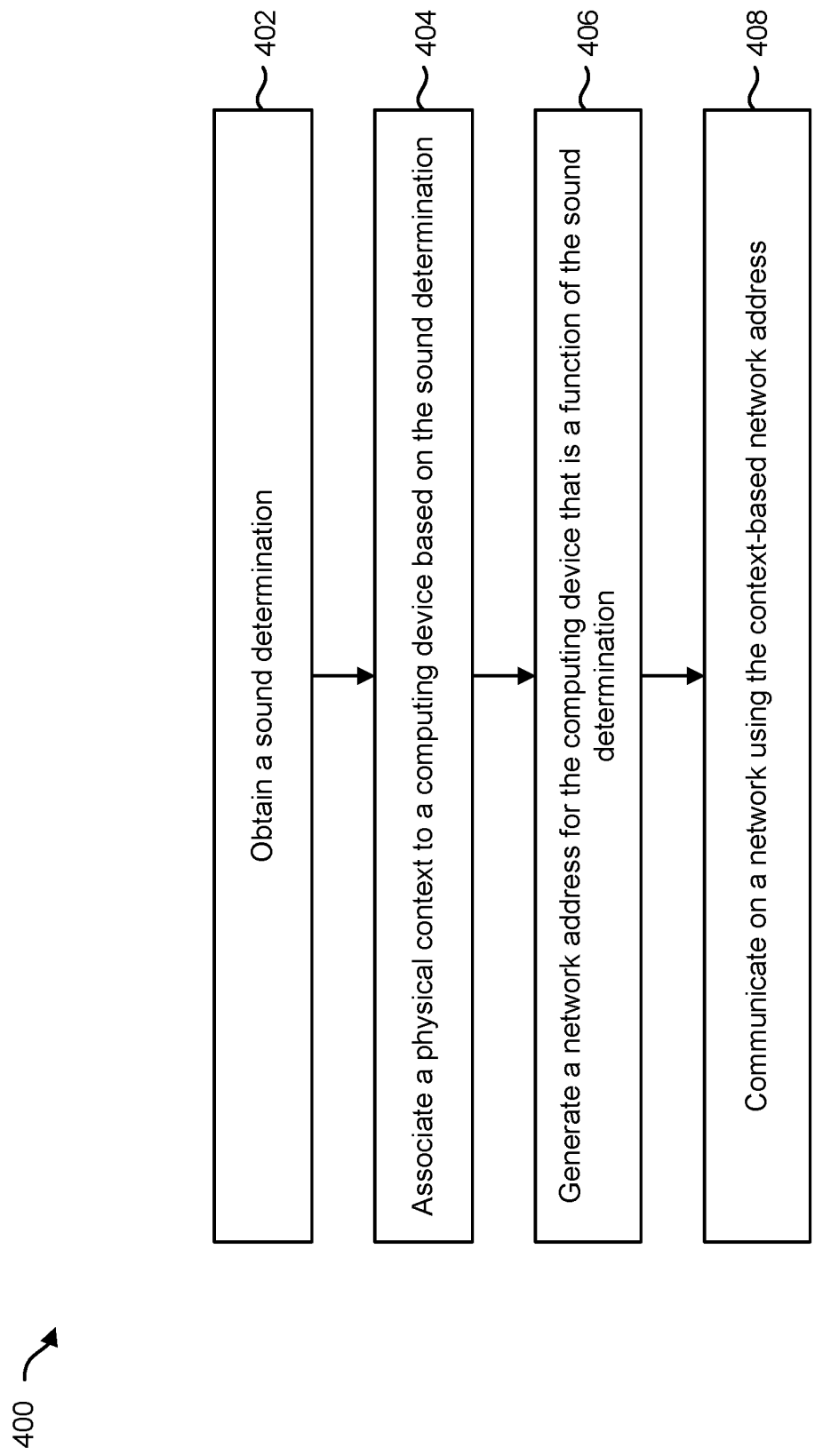
FIG. 4 is a flow diagram illustrating yet another method for context-based device addressing by a computing device.

FIG. 4 is a flow diagram illustrating yet another method 400 for context-based device addressing by a computing device 102. The computing device 102 may obtain 402 a sound determination. For example, the computing device 102 may be configured with a microphone to acquire a sound measurement or the computing device 102 may be configured to receive a sound measurement from a remote location.

The computing device 102 may associate 404 a physical context to the computing device 102 based on the sound determination. For example, sounds may indicate the physical context (e.g., car, restaurant, office, home, open air, windy surrounding, sea side, etc.) of the computing device 102. The computing device 102 may associate a sound template to a certain physical context based on parameters obtained from the sound determination.

The computing device 102 may generate 406 a network address 116 for the computing device 102 that is a function of the sound determination. For example, the computing device 102 may generate 406 a pseudonymous address or a MAC address that is a function of the sound template that matches the sound determination.

The computing device 102 may communicate 408 on the network 100 using the context-based network address 116. This may be accomplished as described in connection with FIG. 2.

Figure 5:
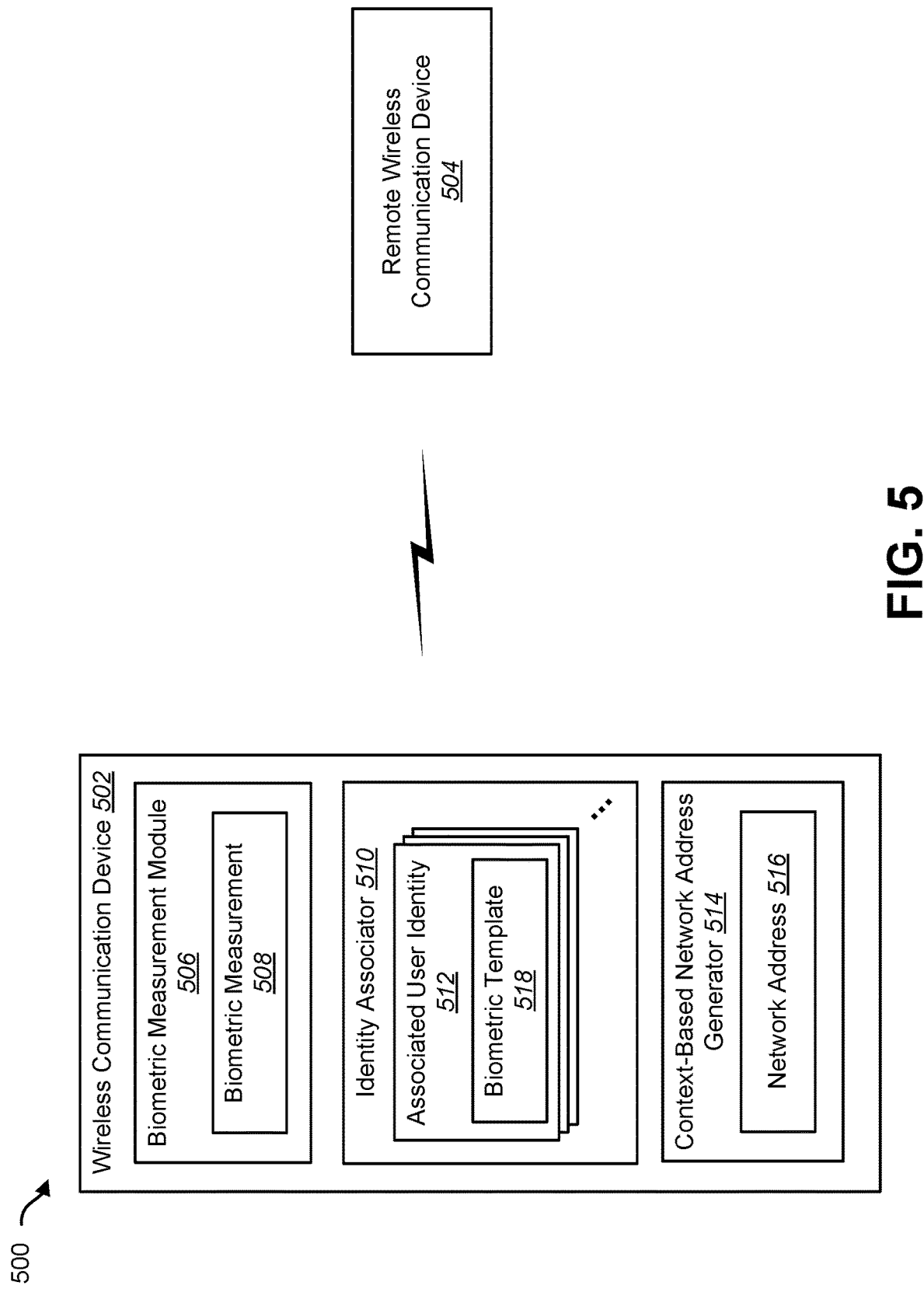
FIG. 5 is a block diagram illustrating a wireless communication device configured for context-based device address generation.

FIG. 5 is a block diagram illustrating a wireless communication device 502 configured for context-based device address generation. The wireless communication device 502 described in connection with FIG. 5 may be implemented in accordance with the computing device 102 described in connection with FIG. 1.

A wireless communication device 502 may also be referred to as a wireless device, a mobile device, mobile station, subscriber station, client, client station, user equipment (UE), remote station, access terminal, mobile terminal, terminal, user terminal, subscriber unit, etc. Examples of the wireless communication device 502 include a wireless headset, wireless earbud or other multimedia device (e.g., remote controller), wireless heart-rate monitor, wireless fitness monitor, or other medical device.

The wireless communication device 502 may be configured to communicate with the remote wireless communication device 504 via a wireless link. For example, the wireless communication device 502 may include a wireless transceiver (i.e., transmitter and receiver) that sends and receives wireless signals using one or more antennas. Examples of a remote wireless communication device 504 include a smartphone, a tablet computer, a desktop computer with wireless transceiver and/or a laptop computer.

In an implementation, the wireless communication device 502 may be configured to communicate using Bluetooth protocols. A wireless communication device 502 configured to communicate using Bluetooth may be referred to as a Bluetooth device. A Bluetooth device may be configured to establish links with one or more target devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel).

Communications in a Bluetooth network may be achieved based on a master polled system. The master polled system may utilize time-division duplexing (TDD) in which a Bluetooth device sends a packet to a target device. For example, the wireless communication device 502 may operate as a peripheral (also referred to as a slave device). The wireless communication device 502 may send a packet to a target remote wireless communication device 504 during pairing, during a connection request or during subsequent communication. In one implementation, the wireless communication device 502 may be a peripheral device that transmits a beacon signal.

The Bluetooth wireless communication standard is typically employed for exchanging communications between fixed or mobile Bluetooth-enabled devices over short distances. In some configurations, the systems and methods disclosed herein may be applied to Bluetooth Low Energy (BLE) devices. LE refers to the "Low Energy" extension of the Bluetooth standard. The BLE extension is focused on energy-constrained applications such as battery-operated devices, sensor applications, etc. The BLE extension may also be referred to as Bluetooth Smart.

The following description uses terminology associated with the Bluetooth and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices 502 that do not conform to Bluetooth standards.

As described above, users are likely to want the wireless communication device 502 to be discovered by and connected to their own mobile only when used by them (and not by another person). For example, in the case of a wireless headset, a user may want the wireless headset to connect to their smartphone only when the wireless headset is being used by the user. When the wireless headset is being used by someone else, the user may not want the wireless headset to connect to their smartphone.

In another example, a customized service provided by one or more service providers may be associated to the wireless communication device 502 based on the network address 516 of the wireless communication device 502. For example, a service may associate the network address 516 with a particular account and/or user. However, if the wireless communication device 502 is shared among multiple users, the service should be unlocked only when a specific person is using the wireless communication device 502 and not someone else. Examples of services provided by a shared infrastructure that may be user specific include a music stream choice, baby-monitor services, security-alerts, person-specific heart-rate monitoring or activity logging.

In an example, a music stream of User A is streamed by her mobile (e.g., remote wireless communication device 504) to the wireless speaker in the living room. In this case, the music stream should be diverted to an earbud (e.g., wireless communication device 502) only when it is User A wearing the earbud.

In another example, if the earbud is shared with User B and used to enable a voice UI of a digital personal assistant, the earbud should forward voice utterances to the digital personal assistant using User B's account credentials only when User B is wearing the earbud, so that when User B asks "Is it a good day?", the digital personal assistant can infer, from User B's profile, that the question is about expected sky visibility for astronomic observations in the night and not about present weather conditions.

Wireless communication devices 502 may be addressed using different approaches. In one approach, the network address 516 may be a Medium Access Control (MAC) Address (e.g., Wi-Fi MAC Address or BD-Address).

In another approach, the network address 516 may be a pseudonymous address associated to the wireless communication device 502 by a master. For example, a Bluetooth low energy non-resolvable private address may include a 46 bit random part followed by two bits (e.g., [random part (46 bits)||11], where the term "||" refers to concatenation). The non-resolvable private address is assigned by the central the peripheral is being bonded with.

In another approach, the network address 516 may be a variable, time-varying, pseudonymous address that can be resolved using cryptographic means. For example, with Bluetooth low energy private resolvable addresses (PRA), each peripheral defines a 128 bit Identity Resolving Key (IRK). The peripheral (e.g., the wireless communication device 502) may share the IRK with a central (e.g., the remote wireless communication device 504 it bonds with.

The peripheral may then beacon using the time-varying PRA that is a function of the IRK. For example, in Bluetooth specifications, the PRA may include 24 bits that are a function of the IRK and a random number, 22 bits that are a function of the random number, and two bits (e.g., "10"). (e.g., PRA(t)=[f(IRK, PRAND(t)) 24 bits||PRAND(t) 22 bits||10], where "t" is a time value). In other terms, the formula reads as the PRA at a given time t (PRA(t)) is equal to A concatenated with B and C, where A is a 24 bit field=f(IRK, B), B is a 22 bit field, the value of the field B being the random number chosen at time t (i.e., PRAND(t)), and C is a two bit field ("10"). The central can determine if received beacons are transmitted by the peripheral by resolving the PRA(t) included in the beacon using the IRK provided by the wireless communication device 502.

The remote wireless communication device 504 may use the network address 516 to (re)discover the wireless communication device 502 and connect to it. If multiple users share the same wireless communication device 502 and each user has paired the wireless communication device 502 with their own mobile or introduced the wireless communication device 502 in a network of service providers, resolving the identity of the user becomes a high level application concern.

In the implementation described in connection with FIG. 5, wireless device addressability is conditioned by biometrics. The wireless communication device 502 includes a biometric measurement module 506. The biometric measurement module 506 may obtain a biometric measurement 508. In one configuration, the biometric measurement module 506 may include a sensor that directly acquires the biometric measurement 508. For example, the biometric measurement module 506 may include a heart rate monitor, fingerprint scanner, facial recognition sensor, iris scanner, voice analyzer, brain activity sensor (e.g., electroencephalography (EEG)) or other biometric sensor. In another configuration, the biometric measurement module 506 may obtain the biometric measurement 508 from a separate biometric sensor.

The biometric measurement 508 may be a biological or behavioral measurement of a user of the wireless communication device 502. The biometric measurements 508 may be distinctive biological and/or behavioral characteristics that are used to identify an individual. Examples of biometric measurements 508 include heart rate and/or heart pattern, stride and step pattern, fingerprint, facial recognition, iris scan, voiceprint voice characteristics, etc.

An identity associator 510 may associate a user identity 512 to the wireless communication device 502 based on the biometric measurement 508. For example, upon enrollment, each user is associated a biometric template 518 that is a fixed set of parameters produced so that a user can be authenticated within a chosen False Acceptance Rate (FAR).

In one implementation, the biometric template 518 may be a voiceprint. In this case, the wireless communication device 502 may generate a voiceprint of a user based on one or more biometric measurements 508 of the user. For example, for User A, the voiceprint(User A) may be a parameterization used to authenticate User A with a FAR of $1/10,000$. The identity associator 510 may store the biometric template 518 of each associated user identity 512.

The wireless communication device 502 may be trained to recognize its users through the biometric measurement 508. For example, upon obtaining a biometric measurement 508, the wireless communication device 502 may match the biometric measurement 508 to a biometric template 518 of an associate user identity 512.

The wireless communication device 502 may include a context-based network address generator 514 to generate a network address 516 based on the associated user identity 512 and the biometric measurement 508. Upon identifying a match to an associated user identity 512 based on the biometric measurement 508, the context-based network address generator 514 may generate a network address 516 for the wireless communication device 502 that is unique to the associated user identity 512.

In an implementation, the context-based network address generator 514 can uniquely derive a pseudonymous address from the biometric template 518 for each enrolled user. In a first approach, the context-based network address generator 514 may determine an IRK using the biometric template 518 of a user. For example, IRK(User X)=SHA256(byte-stream of VoicePrint(User X)), where SHA256 is a cryptographic hash function. The context-based network address generator 514 then generates a PRA using this IRK. It should be noted that in this approach, the PRA may be time-varying, but the IRK for a given associated user identity 512 is repeatable over time.

For BLE, it is important that the IRK is repeatable. Using a given IRK, network addresses 516 may be determined as a function of a random number. If the random number used at time t+1 is the same used at time t, the resulting network address 516 will be the same. The peer device (the central) that the wireless communication device 502 (the peripheral) was bonded with, having knowledge of the IRK will be able to identify the peripheral in either cases (i.e., if the PRA has changed or not).

In another approach, the context-based network address generator 514 may generate a pseudonymous fixed MAC address using a biometric template 518. For example, Fixed MAC-Address=f(SHA256(byte-stream of VoicePrint(User X))).

The wireless communication device 502 may communicate on the network 500 using the biometric-based network address 516. For example, the wireless communication device 502 may start advertising its presence on the network 500 using the pseudonymous network address 516 associated to the user of the wireless communication device 502. The wireless communication device 502 (i.e., peripheral device) may bond with the user's own devices or the infrastructure using the pseudonymous network address 516 or sharing the keying material (e.g., IRK) behind pseudonymous network address 516. The wireless communication device 502 may use the pseudonymous network address 516 in a manner entirely transparent to the connectivity protocol used (i.e., there may be no need to change the connectivity protocol).

In an example, during Bluetooth Low Energy bonding, when pairing a headset worn by User A with User A's smartphone, the headset provides the smartphone with the IRK that is generated for User A using the biometric template 518 of User A. The very same headset, when pairing with the smart-speakers in the household while worn by User B, will share the IRK generated for User B.

The network address 516 generated based on the biometric measurement 508 is reproducible. In other words, each time the wireless communication device 502 obtains a biometric measurement 508 for a certain user, the wireless communication device 502 may generate the same network address 516. When an enrolled user wears the wireless communication device 502, the wireless communication device 502 repeats the biometric measurement 508. The wireless communication device 502 then finds a match against the stored biometric templates 518, thus identifying the user.

The wireless communication device 502 reconstructs the pseudonymous network address 516 associated to that specific user. For example, every time the wireless communication device 502 is used by a different person, following biometric authentication, the wireless communication device 502 may re-assign the network address 516 as a function of the matched biometric template 518.

In an example, the wireless communication device 502 determines the IRK of User A based on the biometric template 518 of User A. In this case, IRK(User A)=SHA256 (byte-stream of VoicePrint(User A)). The wireless communication device 502 may then generate a PRA based on the IRK. For example, PRA(Device worn by User A)(t)=[f(IRK (User A), PRAND(t)) 24 bits||PRAND(t) 22 bits||10]. The wireless communication device 502 then starts advertising its presence using the pseudonymous network address 516 associated to the user.

Each enrolled user may pair the wireless communication device 502 that the user is using. The wireless communication device 502 may be operating on the wireless medium with the user-specific network address 516. The user may pair the wireless communication device 502 with their mobile or registers the wireless communication device 502 with a service provider network.

When other remote wireless communication devices 504 bonded to a specific user (or a shared infrastructure) discover the wireless communication device 502 advertising with the User's pseudonymous network address 516 that they are bonded with, the remote wireless communication devices 504 can connect to the wireless communication device 502. The remote wireless communication device 504 may then immediately provide the wireless communication device 502 with the services targeted/authorized to that specific and authenticated User.

The issue of determining if a mobile should stream to the device or which user-specific profile should be unlocked by a service provider, is now resolved by means of device address filtering, at the lowest layers of the wireless communication stack (e.g., Layer 1/2), instead of requiring complex management at the Application Layer. The physical wireless communication device 502, through its user-conditioned network address 516, becomes a source of identification, which is unique per user.

In an example, User A's smartphone will recognize the headset as a bonded device when worn by User A because the PRA can be resolved using the IRK generated for User A. User A's smartphone can start streaming User A's music to the headset. However, User B's smartphone will not recognize the headset as a bonded device because its PRA resolution process using the IRK of User B fails.

In another example, hospital infrastructure will detect the presence of a wireless communication device 502 whose network address 516 is associated to Nurse C. The hospital infrastructure will then let Nurse C's wireless communication device 502 download the task-list for the day without connecting to it first and requesting Nurse C to authenticate later.

Figure 6:
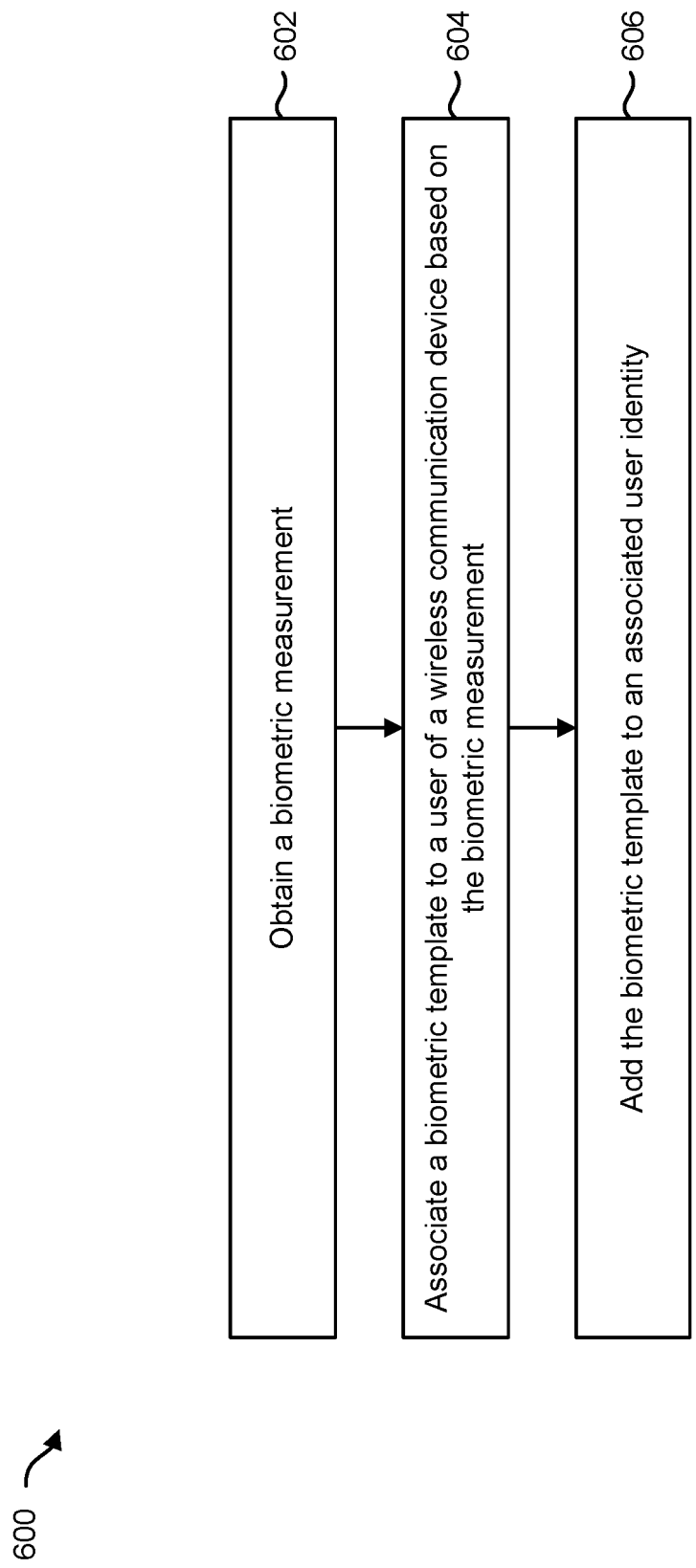
FIG. 6 is a flow diagram illustrating a method for associating an identity to a wireless communication device based on a biometric measurement.

FIG. 6 is a flow diagram illustrating a method 600 for associating an identity to a wireless communication device 502 based on a biometric measurement 508. The wireless communication device 502 may obtain 602 a biometric measurement 508. For example, the wireless communication device 502 may be configured with a biometric sensor to acquire the biometric measurement 508 or the wireless communication device 502 may be configured to receive a biometric measurement 508 from a remote location.

The wireless communication device 502 may associate 604 a biometric template 518 to a user of the wireless communication device 502 based on the biometric measurement 508. For example, upon enrollment, each user is associated a biometric template 518 that is a fixed set of parameters produced so that a user can be authenticated within a chosen False Acceptance Rate (FAR). In an implementation, the biometric template 518 may be a voiceprint of the user.

The wireless communication device 502 may add 606 the biometric template 518 to an associated user identity 512. For example, the wireless communication device 502 may store the biometric template 518 of each associated user.

Figure 7:
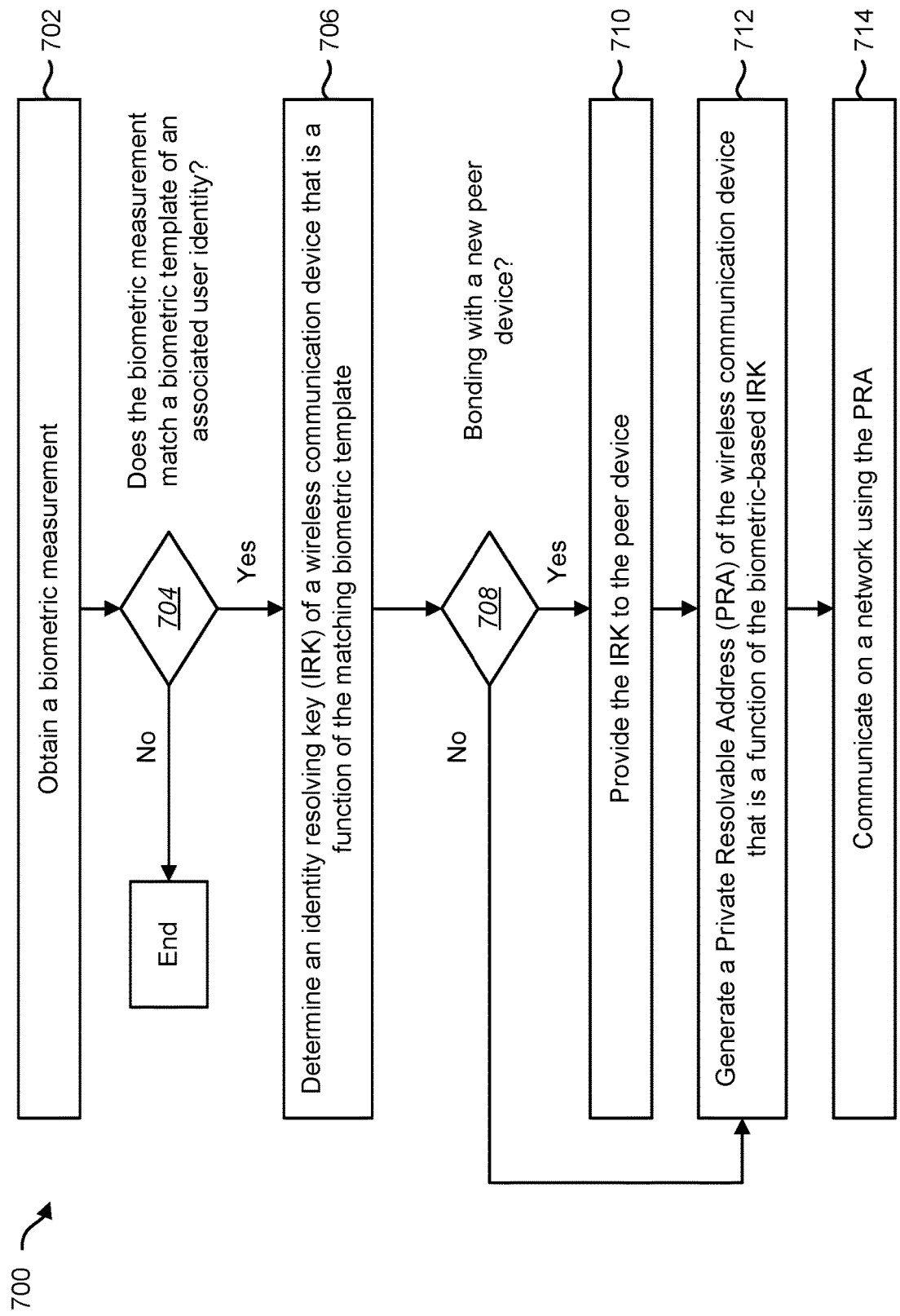
FIG. 7 is a flow diagram illustrating a method for generating a network address for a wireless communication device.

FIG. 7 is a flow diagram illustrating a method 700 for generating a network address 516 for a wireless communication device 502. The wireless communication device 502 may obtain 702 a biometric measurement 508. This may be accomplished as described in connection with FIG. 6.

The wireless communication device 502 may determine 704 whether the biometric measurement 508 matches a biometric template 518 of an associated user identity 512. The wireless communication device 502 may store one or more biometric templates 518 as described in connection with FIG. 6. If the biometric measurement 508 does not match a biometric template 518 of an associated user identity 512, then the method 700 ends.

If the biometric measurement 508 matches a biometric template 518, then the wireless communication device 502 may determine 706 an identity resolving key (IRK) that is a function of the matching biometric template 518. For example, the wireless communication device 502 may generate the IRK using the voiceprint of the associated user identity 512 as an input to a cryptographic hash function (e.g., SHA256).

The wireless communication device 502 may determine 708 whether it is bonding with a new peer device (e.g., a remote wireless communication device 504). If the wireless communication device 502 is bonding with the peer device (e.g., the wireless communication device 502 has not paired with peer device before), the wireless communication device 502 may provide 710 the IRK to the peer device during a bonding operation. If the wireless communication device 502 has already bonded with the peer device, the wireless communication device 502 has already provided the IRK to the peer device and need not retransmit the IRK to the peer device.

The wireless communication device 502 may generate 712 a private resolvable address (PRA) that is a function of the biometric-based IRK. For example, the time-varying PRA may include 24 bits that are a function of the IRK and a random number, 22 bits that are a function of the random number, and two bits (e.g., "10"). In an expression, PRA(t)=[f(IRK, PRAND(t)) 24 bits||PRAND(t) 22 bits||10], where "t" is a time value.

The wireless communication device 502 may communicate 714 on a network 500 using the PRA. For example, the wireless communication device 502 may start sending advertising beacons on the network 500 that include the PRA. In an implementation, the beacons may be Bluetooth low energy beacons. A remote wireless communication device 504 may determine if received beacons are transmitted by the wireless communication device 502 by resolving the PRA included in the beacon using the IRK provided by the wireless communication device 502.

Figure 8:
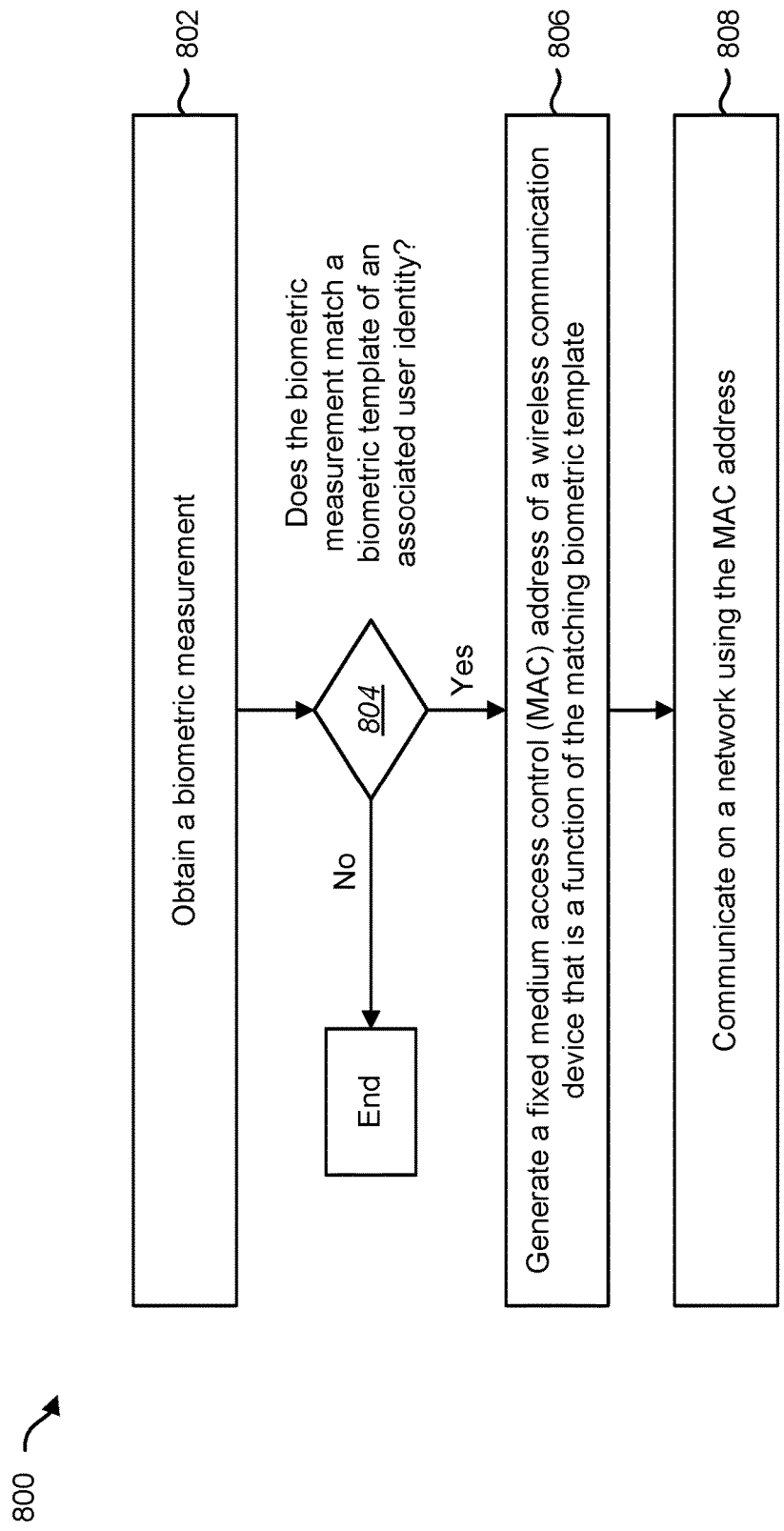
FIG. 8 is a flow diagram illustrating another method for generating a network address for a wireless communication device.

FIG. 8 is a flow diagram illustrating another method 800 for generating a network address 516 for a wireless communication device 502. The wireless communication device 502 may obtain 802 a biometric measurement 508. This may be accomplished as described in connection with FIG. 6.

The wireless communication device 502 may determine 804 whether the biometric measurement 508 matches a biometric template 518 of an associated user identity 512. The wireless communication device 502 may store one or more biometric templates 518 as described in connection with FIG. 6. If the biometric measurement 508 does not match a biometric template 518 of an associated user identity 512, then the method 800 ends.

If the biometric measurement 508 matches a biometric template 518, then the wireless communication device 502 may generate 806 a fixed MAC address based on the biometric template 518. For example, the wireless communication device 502 may generate the pseudonymous MAC address using the voiceprint of the associated user identity 512 as an input to a cryptographic hash function (e.g., SHA256). In an expression, Fixed MAC-Address=f (SHA256(byte-stream of VoicePrint(User X))).

The wireless communication device 502 may communicate 808 on a network 500 using the MAC address. For example, the wireless communication device 502 may start sending advertising beacons on the network 500 that include the MAC address.

Figure 9:
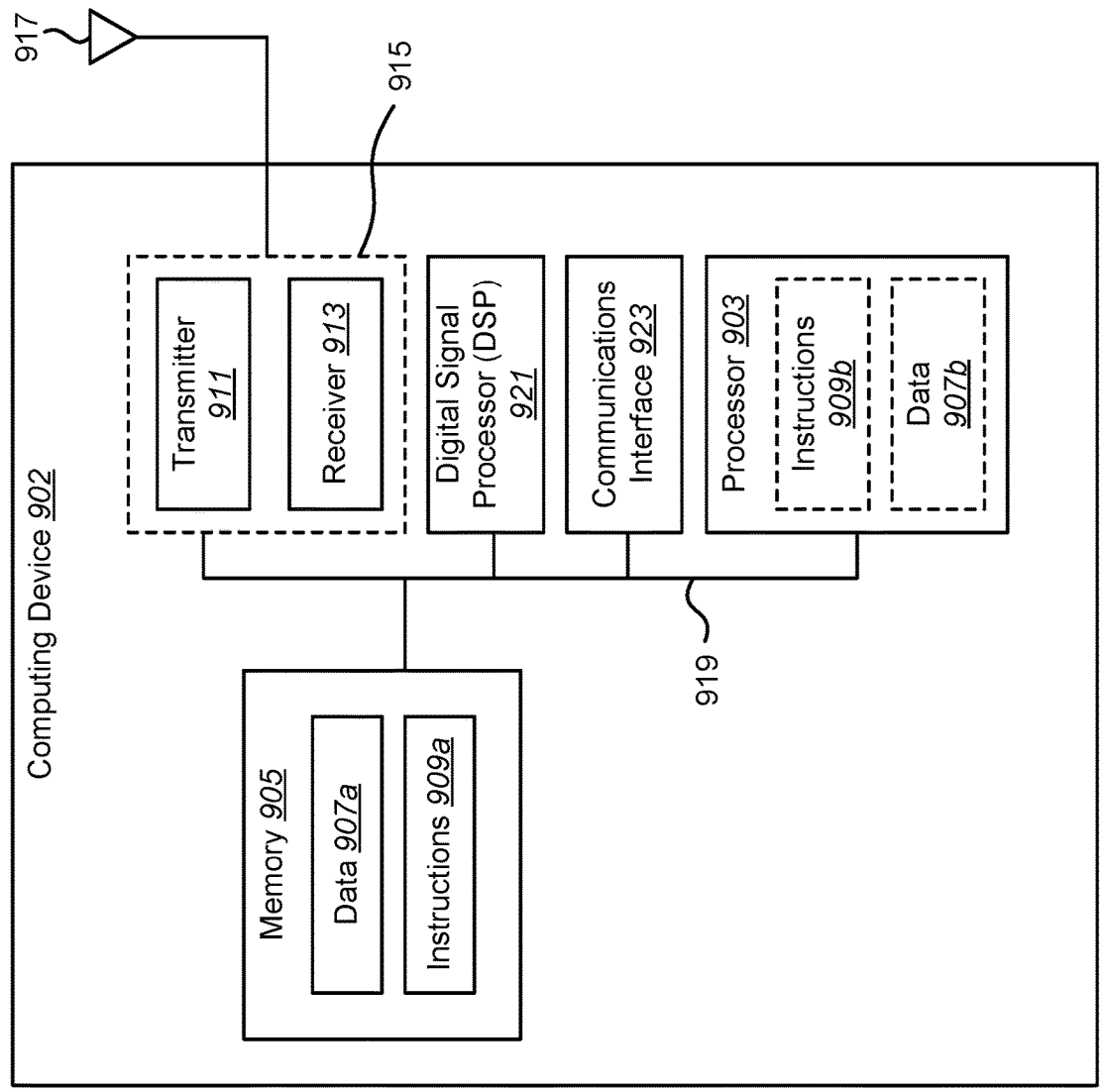
FIG. 9 illustrates certain components that may be included within a computing device.

FIG. 9 illustrates certain components that may be included within a computing device 902. The computing device 902 may be a wireless device, an access terminal, a mobile station, a user equipment (UE), a laptop computer, a desktop computer, etc. For example, the computing device 902 of FIG. 9 may be implemented in accordance with the computing device 102 of FIG. 1 or the wireless communication device 502 of FIG. 5.

The computing device 902 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the computing device 902 of FIG. 9, in an alternative configuration, a combination of processors (e.g., an ARM and DSP) could be used.

The computing device 902 also includes memory 905 in electronic communication with the processor 903 (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 907a and instructions 909a may be stored in the memory 905. The instructions 909a may include one or more programs, routines, sub-routines, functions, procedures, code, etc. The instructions 909a may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The computing device 902 may also include a transmitter 911 and a receiver 913 to allow transmission and reception of signals to and from the computing device 902 via an antenna 917. The transmitter 911 and receiver 913 may be collectively referred to as a transceiver 915. The computing device 902 may also include (not shown) multiple transmitters, multiple antennas, multiple receivers and/or multiple transceivers.

The computing device 902 may include a digital signal processor (DSP) 921. The computing device 902 may also include a communications interface 923. The communications interface 923 may allow a user to interact with the computing device 902.

The various components of the computing device 902 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C; A and B (but not C); B and C (but not A); A and C (but not B); or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C; A and B (but not C); B and C (but not A); A and C (but not B); or all of A, B, and C.

As used herein, the phrase "one or more of" should be interpreted to mean one or more items. For example, the phrase "one or more of A, B and C" or the phrase "one or more of A, B or C" should be interpreted to mean any of: only A, only B, only C; A and B (but not C); B and C (but not A); A and C (but not B); or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
    associating an identity to a computing device based on a context measurement, wherein the associated identity is selected from multiple identities stored on the computing device;
    generating a network address for the computing device based on the associated identity;
    communicating on a network using the network address; and
    wherein generating the network address for the computing device comprises:
        identifying a match to an associated identity based on a biometric measurement; and
        determining an identity resolving key (IRK) of the computing device that is a function of the biometric measurement.

2. The method of claim 1, wherein the context measurement includes the biometric measurement and the network address of the computing device is a function of the biometric measurement.

3. The method of claim 1, wherein the context measurement includes a sound determination identifying a physical context, and the network address of the computing device is a function of the sound determination.

4. The method of claim 1, wherein associating an identity to the computing device based on a context measurement comprises:
    associating a biometric template to a user of the computing device based on the biometric measurement.

5. The method of claim 1, wherein generating the network address for the computing device further comprises:
    generating a private resolvable address (PRA) of the computing device that is a function of the biometric measurement-based IRK.

6. The method of claim 1, wherein generating the network address for the computing device comprises:
    generating a fixed medium access control (MAC) address of the computing device that is based on the biometric measurement.

7. The method of claim 1, further comprising bonding with a remote computing device using the network address generated using the biometric measurement.

8. The method of claim 1, wherein the network address is repeatable over time for context measurements that are within a threshold of the associated identity.

9. A method comprising:
    associating an identity to a computing device based on a context measurement, wherein the associated identity is selected from multiple identities stored on the computing device;
    generating a network address for the computing device based on the associated identity;
    communicating on a network using the network address;
    bonding with a remote computing device using the network address generated using a biometric measurement; and
    wherein bonding with a remote computing device using the network address comprises sharing an identity resolving key (IRK) generated as a function of the biometric measurement with the remote computing device.

10. A method comprising:
    associating an identity to a computing device based on a context measurement, wherein the associated identity is selected from multiple identities stored on the computing device;
    generating a network address for the computing device based on the associated identity;
    communicating on a network using the network address; and
    wherein an identity resolving key (IRK) generated as a function of the biometric measurement is repeatable over time for context measurements that are within a threshold of the associated identity.

11. A computing device, comprising:
    a memory;

a processor in communication with the memory, the processor configured to:
  associate an identity to the computing device based on a context measurement wherein the associated identity is selected from multiple identities stored on the computing device;
  generate a network address for the computing device based on the associated identity;
  communicate on a network using the network address; and
wherein the processor configured to generate the network address for the computing device comprises the processor configured to:
  identify a match to an associated identity based on a biometric measurement; and
  determine an identity resolving key (IRK) of the computing device that is a function of the biometric measurement.

12. The computing device of claim 11, wherein the context measurement includes the biometric measurement and the network address of the computing device is a function of the biometric measurement.

13. The computing device of claim 11, wherein the context measurement includes a sound determination identifying a physical context, and the network address of the computing device is a function of the sound determination.

14. The computing device of claim 11, wherein the processor configured to associate an identity to the computing device based on a context measurement comprises the processor configured to:
  associate a biometric template to a user of the computing device based on the biometric measurement.

15. The computing device of claim 11, wherein the processor configured to generate the network address for the computing device further comprises the processor configured to:
  generate a private resolvable address (PRA) of the computing device that is a function of the biometric measurement-based IRK.

16. The computing device of claim 11, wherein the processor configured to generate the network address for the computing device comprises the processor configured to:
  generate a fixed medium access control (MAC) address of the computing device that is based on the biometric measurement.

17. A non-transitory tangible computer readable medium, the computer readable medium storing computer executable code, comprising:
  code for causing a computing device to associate an identity to the computing device based on a context measurement, wherein the associated identity is selected from multiple identities stored on the computing device;
  code for causing the computing device to generate a network address for the computing device based on the associated identity;
  code for causing the computing device to communicate on a network using the network address; and
  wherein the code for causing the computing device to generate the network address for the computing device comprises code for causing the computing device to:
    identify a match to an associated identity based on a biometric measurement; and
    determine an identity resolving key (IRK) of the computing device that is a function of the biometric measurement.

18. The non-transitory tangible computer readable medium of claim 17, wherein the context measurement includes the biometric measurement and the network address of the computing device is a function of the biometric measurement.

19. The non-transitory tangible computer readable medium of claim 17, wherein the context measurement includes a sound determination identifying a physical context, and the network address of the computing device is a function of the sound determination.

20. The non-transitory tangible computer readable medium of claim 17, wherein the code for causing the computing device to associate an identity to the computing device based on a context measurement comprises code for causing the computing device to:
  associate a biometric template to a user of the computing device based on the biometric measurement.

21. The non-transitory tangible computer readable medium of claim 17, wherein code for causing the computing device to generate the network address for the computing device further comprises code for causing the computing device to:
  generate a private resolvable address (PRA) of the computing device that is a function of the biometric measurement-based IRK.

* * * * *